(12) United States Patent
Chu-Ke et al.

(10) Patent No.: US 7,880,949 B1
(45) Date of Patent: Feb. 1, 2011

(54) DISPLAY DEVICE AND ELECTRO-OPTICAL APPARATUS USING SAME

(75) Inventors: Hui Chu-Ke, Hsin-Chu (TW); Sheng-Wen Cheng, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 12/757,971

(22) Filed: Apr. 9, 2010

(30) Foreign Application Priority Data

Dec. 15, 2009 (TW) .............................. 98142981 A

(51) Int. Cl.
G02F 1/03 (2006.01)
(52) U.S. Cl. ........................................ 359/259; 349/43
(58) Field of Classification Search .................. 359/259
See application file for complete search history.

(56) References Cited

U.S. PATENT DOCUMENTS 7,532,269 B2   5/2009   Ahn

2006/0158575 A1*   7/2006   Shin et al. ..................... 349/38

* cited by examiner

*Primary Examiner*—Jordan M. Schwartz
*Assistant Examiner*—James C Jones
(74) *Attorney, Agent, or Firm*—Chun-Ming Shih

(57) ABSTRACT

A display device includes a number of sub-pixels. A main region and a sub region are defined in each sub-pixel, and correspond to a first pixel electrode and a second pixel electrode respectively. The first and the second pixel electrodes are separated from each other and thereby forming a gap between the first and the second pixel electrodes substantially perpendicular to the gate lines. Each sub-pixel includes a coupling electrode, a first switching transistor, a second switching transistor and a sharing transistor. The coupling electrode is capacitively coupled with the first pixel electrode. The first switching transistor and the second switching transistor are electrically connected to a gate line, a data line, and respectively connected to the first and the second pixel electrodes. The sharing transistor is electrically connected to another gate line, the coupling electrode and the second pixel electrode.

9 Claims, 5 Drawing Sheets

DISPLAY DEVICE AND ELECTRO-OPTICAL APPARATUS USING SAME

This application claims the right of priority based on Taiwan Patent Application No. 098142981 entitled "Display Device and Electro-Optical Apparatus Using the Same", filed on Dec. 15, 2009, which is incorporated herein by reference and assigned to the assignee herein.

BACKGROUND

1. Technical Field

The present invention relates to display technology, and particularly to a display device and an electro-optical apparatus including the same.

2. Related Art

With continuous advances of technology, display devices capable of saving energy or improving brightness are become more and more important. Thus, multi-primary color display devices that can improve transmittance and reduce power consumption of backlights have been developed out. Multi-primary color display devices mainly utilize high transmittance of white sub-pixels to improve their brightness. On the other hand, multi-primary color display devices may also improve their brightness by incorporating yellow or other colors which have greater brightness, and save electric through improvement of brightness. In contrast, conventional display devices that only have three sub-pixels such as red (R), green (G), and blue (B) can only provide limited brightness. Therefore, visibility of conventional display devices is relatively low when they are placed at outdoor or the brightness of external ambient light is too high.

FIG. 1 is a top schematic view showing a sub-pixel structure of a known red-green-blue-white (RGBW) multi-primary color display device. As shown in FIG. 1, each sub-pixel 10 includes two common electrodes COM formed on a substrate (not shown), two auxiliary electrodes 113 and 133, pixel electrodes PX1 and PX2, coupling electrode 120, switching transistors Ta and Tc, and sharing transistor Tb. The common electrodes COM include two metal wires extending along a direction substantially perpendicular to data lines DL(y) and DL(y+1). The auxiliary electrode 113, is located between the common electrodes COM and the pixel electrode, and is connected to the pixel electrode PX1. The auxiliary electrode 133, is located between the common electrodes COM and the pixel electrode PX2, and is connected to the pixel electrode PX2. The pixel electrodes PX1 and PX2 are vertically arranged, and the auxiliary electrodes 113 and 133 are also vertically arranged. Date lines DL(y) and DL(y+1) are located at left and right sides of the pixel electrodes PX1 and PX2. Gate lines GL(x) and GL(x+1), are located between the pixel electrodes PX1 and PX2, and are crossover the data lines DL(y) and DL(y+1). Both of gate electrodes of the switching transistors Ta and Tc are electrically connected to the gate line GL(x). Both of source electrodes of the switching transistors Ta and Tc are electrically connected to the data line DL(y). A drain electrode of the switching transistor Ta is electrically connected to the pixel electrode PX1, and a drain electrode of the switching transistor Tc is electrically connected to the pixel electrode PX2. A gate electrode of the sharing transistor Tb is electrically connected to the gate line GL(x+1). A source electrode of the sharing transistor Tb is directly connected to the drain electrode of the switching transistor Tc. That is, the source electrode of the sharing transistor Tb and the drain electrode of the switching transistor Tc directly share a same metal piece. The drain electrode of the sharing transistor Tb is electrically connected to the coupling electrode 120, and the coupling electrode 120 is capacitively coupled to both of the common electrodes COM, the auxiliary electrode 113 and the pixel electrode PX1.

In the above described display devices, the pixel electrodes PX1 and PX2 of the sub-pixel 10 are vertically arranged and this configuration is suitable for a rectangle shaped sub-pixel, and both of the length of the metal wires of the common electrodes COM and the length of the metal wires of the gate electrode are equal to the length of a short edge of the rectangle. However, when the vertically arranged pixel electrodes PX1 and PX2 are employed in a square sub-pixel configuration (which has better display effect), the length of the metal wires of the common electrodes COM and the gate electrode increases such that the aperture ratio is greatly reduced, and in addition, lead to the problem of poor orientation of liquid crystal molecules.

BRIEF SUMMARY

The present invention provides a display device, which has improved aperture ratio and also can avoid the problem of poor orientation of liquid crystal molecules.

The present invention also provides an electro-optical apparatus employing a display device which has improved aperture ratio and also can avoid the problem of poor orientation of liquid crystal molecules.

An embodiment of the present invention provides a display device, which include a substrate, and a plurality of gate lines, a plurality of data lines disposed on the substrate. The data lines are substantially staggered with the gate lines and being define a plurality of sub-pixels. Each of the sub-pixels includes a pixel area defined by two adjacent gate lines of the gate lines and two adjacent data lines of the data lines. The pixel area at least includes a first region and a second region. Each of the sub-pixels includes a first pixel electrode, a second pixel electrode, a coupling electrode, a first switching transistor, a second switching transistor, and a sharing transistor. The first pixel electrode is disposed within the first region; and the second pixel electrode is disposed within the second region. The second pixel electrode is spaced apart from the first pixel electrode thereby defining a gap is located between the second pixel electrode and the first pixel electrode. The gap is substantially perpendicular to the gate lines. The coupling electrode is disposed in the first region, and is capacitively coupled to the first pixel electrode. Gate electrodes of the first switching transistor and the second switching transistor are both electrically connected to one of the two adjacent gate lines. First source or drain electrodes of the first switching transistor and the second switching transistor are both electrically connected to one of the two adjacent data lines. A second source or drain electrode of the first switching transistor is electrically connected to the first pixel electrode, and a second source or drain electrode of the second switching transistor is electrically connected to the second pixel electrode. A gate electrode of the sharing transistor is electrically connected to another of the two adjacent gate lines, a first source or drain electrode of the sharing transistor is electrically connected to the coupling electrode, and a second source or drain electrode of the sharing transistor is electrically connected to the second pixel electrode.

In one embodiment of the present invention, the sub-pixels include red sub-pixels, green sub-pixels, blue sub-pixels, and white sub-pixels.

In one embodiment of the present invention, a ratio of an area of the coupling electrode and an area of a transparent portion of the pixel area is in the range from about 2.5% to about 4.5%.

In one embodiment of the present invention, the ratio of the length of the pixel area along a direction substantially parallel to the data lines to the width of the pixel area along a direction substantially parallel to the gate lines is in the range from about 0.9 to about 1.1.

In one embodiment of the present invention, each of the sub-pixels further includes a common electrode. The common electrode can be disposed between the substrate and the coupling electrode, between the substrate and the first pixel electrode, and between the substrate and the second pixel electrode. The common electrode is capacitively coupled to the coupling electrode, the first pixel electrode and the second pixel electrode.

In one embodiment of the present invention, each of the sub-pixels further includes a first auxiliary electrode. The first auxiliary electrode is between the common electrode and the first pixel electrode, and is electrically connected to the first pixel electrode.

In one embodiment of the present invention, each of the sub-pixels further includes a second auxiliary electrode. The second auxiliary electrode is between the common electrode and the second pixel electrode, and is electrically connected to the second pixel electrode and the second source or drain electrode of the sharing transistor.

In one embodiment of the present invention, the first pixel electrode and the second pixel electrode both include a plurality of bar shaped portions. A slit is formed between two adjacent bar shaped portions.

Another embodiment of the present invention provides an electro-optical apparatus, which includes above mentioned display device.

In the display device provided by the embodiment of the present invention, each sub-pixel includes the first region and the second region arranged along a direction substantially perpendicular to the data lines. The first pixel electrode and the second pixel electrode are respectively disposed in the first region and second region, and are spaced apart from each other. Thus, the first pixel electrode and the second pixel electrode can be applied in to a square sub-pixel configuration, and the number of metal wires of the common electrodes along a direction substantially perpendicular to the data lines can be reduced one. As a result, the aperture ratio is improved. At the same time, the first region and the second region have adequate size such that the problem of poor orientation of liquid crystal molecules can be avoided.

Other aspects, details, and advantages of the present display device are further described accompanying with preferred embodiments and figures as follows.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
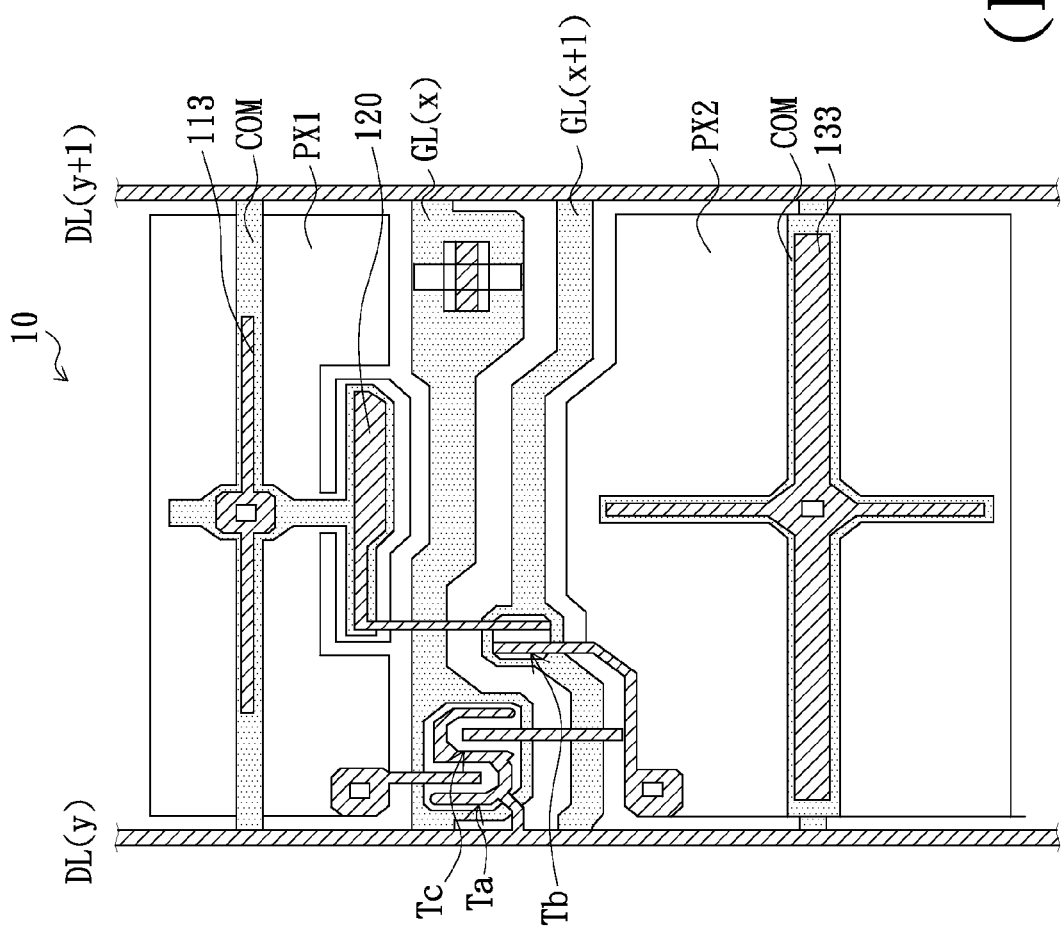
FIG. 1 is a top schematic view showing sub-pixel structure of a known red-green-blue-white (RGBW) multi-primary color display device.
Figure 2:
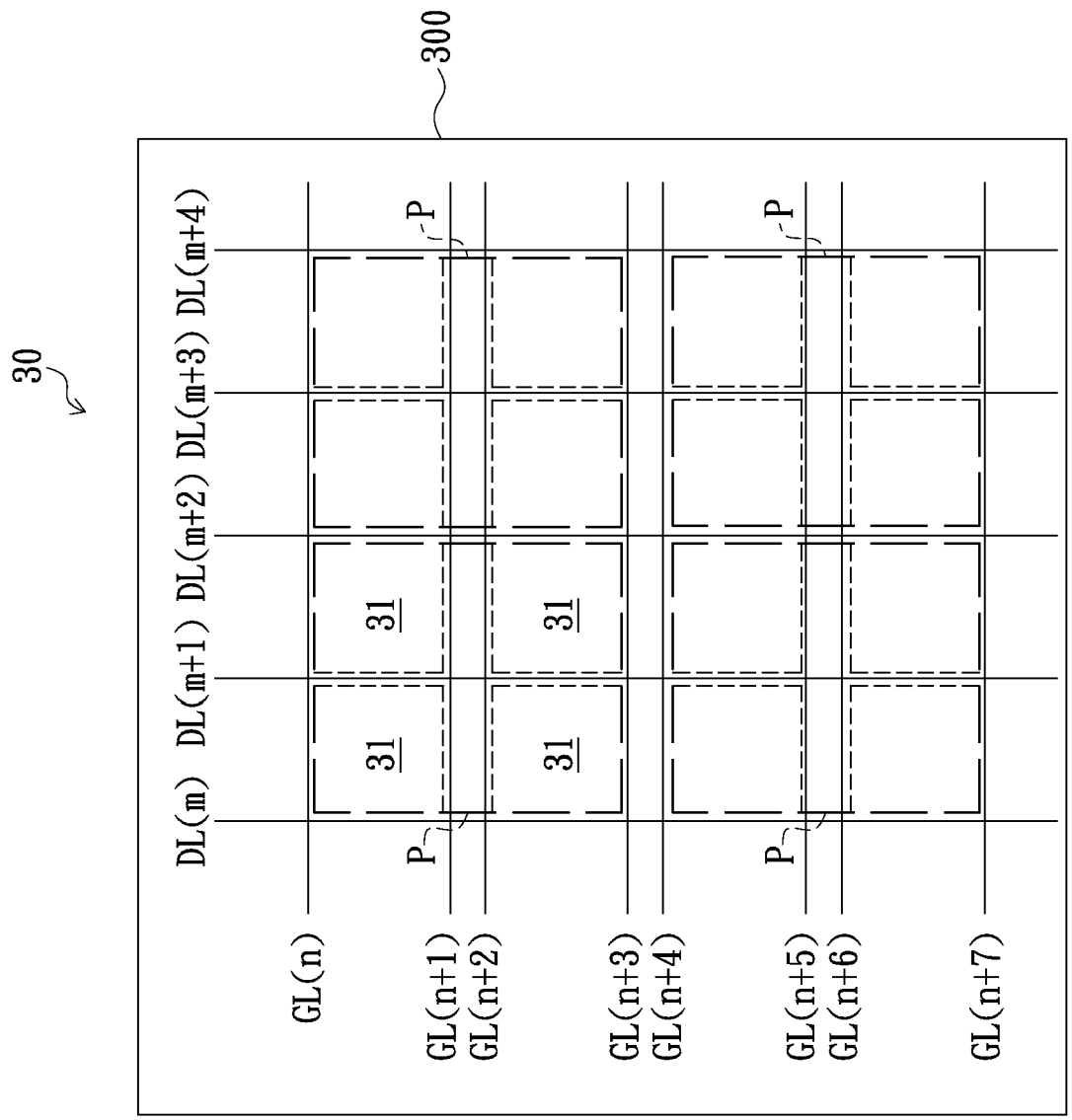
FIG. 2 is a partial schematic view of a display device in accordance with an embodiment of the present invention.

Referring to FIG. 2, a display device 30 in accordance with an embodiment of the present invention includes a substrate 300, and a plurality of gate lines (or namely scanning lines) such as GL(n)~GL(n+7) and a plurality of data lines (or namely signal lines) such as DL(m)~DL(m+4) formed on the substrate 300. The gate lines GL(n)~GL(n+7) and the data lines DL(m)~DL(m+4) are alternately arranged to define a number of sub-pixels 31. In the present embodiment, four sub-pixels 31 constitute a pixel P, and sub-pixels 31 in each pixel P can include a first color sub-pixel, a second color sub-pixel, a third color sub-pixel, and a fourth color sub-pixel. For example, each pixel P can include a red color sub-pixel, a green color sub-pixel, a blue color sub-pixel, and a white color sub-pixel. However, the color of the sub-pixels are not limited as above listed, and can be other colors selected from color coordinate, such as yellow or other colors having higher brightness. In other embodiments, at least four sub-pixels 31 constitute a pixel P.

In addition, distal ends of two gate lines between two adjacent sub-pixels 31, for example, the gate lines GL(n+1) and GL(n+2), are not connected together (as shown in FIG. 2). In other words, signals introduced into the gate lines GL(n+1) and GL(n+2) can be different. Thus, there are more options for signals. In other embodiments, distal ends of two gate lines between two adjacent sub-pixels 31, for example, the gate lines GL(n+1) and GL(n+2), can be connected together (not shown). That is, the gate lines GL(n+1) and GL(n+2) share the same signals.

Figure 3:
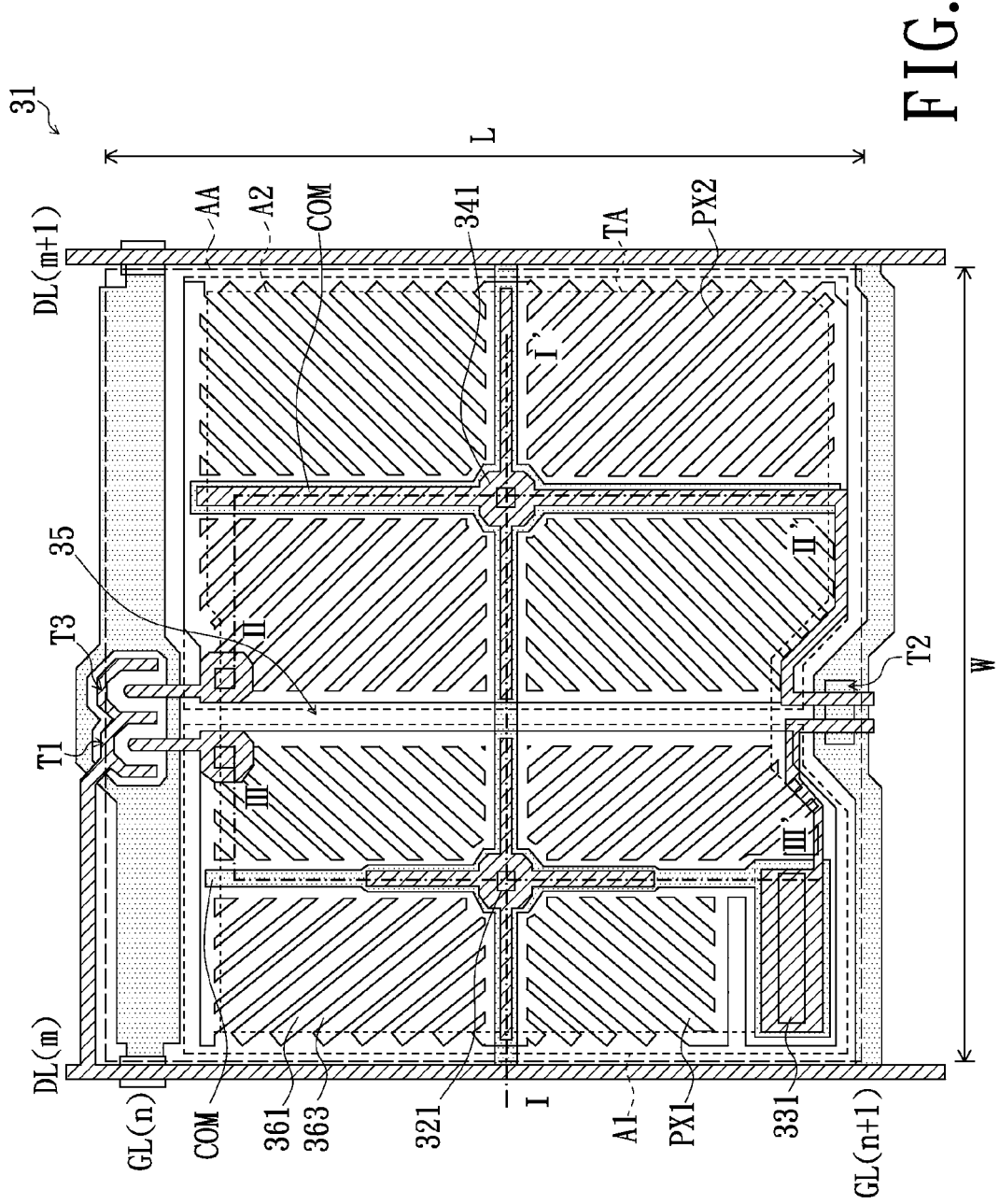
FIG. 3 is a schematic view showing a layout design for a sub-pixel in the display device of FIG. 2.

FIG. 3 illustrates a layout design for the sub-pixel 31 in accordance with an embodiment of the present invention. As shown in FIG. 3, the sub-pixel 31 includes a pixel area AA defined by two adjacent gate lines GL(n), GL(n+1) of GL(n) ~GL(n+7) and two adjacent data lines DL(m), DL(m+1) of DL(m)~DL(m+4). The pixel area AA at least includes a first region A1 and a second region A2 arranged along a direction substantially perpendicular to the data lines. In other words, the first region A1 and the second region A2 are horizontally arranged in the pixel area AA. The first region A1 and the second region A2 can be a main region and a sub region, respectively. However, the first region A1 can also be the sub region and the second region A1 is the main region. The ratio of the length L of the pixel area AA along a direction substantially parallel to the data lines DL(m) and DL(m+1) to the width W of the pixel area AA along a direction substantially parallel to the gate lines GL(n) and GL(n+1) is in the range from about 0.9 to about 1.1. That is, the pixel area AA is square or approximately square. In the present embodiment, at least four sub-pixels constitute a pixel P, and the ratio of the length and the width is in the range from approximately 0.9 to approximately 1.1. In addition, the sub-pixel 31 include pixel electrodes PX1 and PX2, a coupling electrode 331, switching transistors T1 and T3, a sharing transistor T2, auxiliary electrodes 321 and 341, and common electrode COM. In the present embodiment, the pixel electrodes PX1 and PX2 both have a number of bar shaped portions 361, and a slit 363 is formed between two adjacent bar shaped portions 361, which means there is no pixel electrode material exists. This pixel electrode structure is helpful for solving the problem of color shift from various view angles. The ratio of an area of the coupling electrode 331 and an area of a transparent portion TA of the pixel area AA can be in the range from about 2.5% to about 4.5%. The transparent portion TA is a portion of the pixel area AA that can be used to display, and includes slit 363 between the bar shaped portions 361 of the pixel electrodes PX1, PX2 and a portion of the pixel electrode PX1, PX2 that are not covered by both of the common electrode COM, the gate lines GL(n)~GL(n+7), data lines DL(m)~DL(m+4), and the auxiliary electrodes 321 and 341.

As described above, the pixel electrode PX1 is disposed in the first region A1, and the pixel electrode PX2 is disposed in the second region A2. The pixel electrode PX2 and the pixel electrode PX1 are spaced apart from each other thereby defining a gap 35 extending along a direction substantially parallel to the data lines DL(m) and DL(m+1) and substantially perpendicular to the gate lines GL(n), GL(n+1). In the present embodiment, there is no need to dispose gate lines GL(n)~GL(n+7) and data lines DL(m)~DL(m+4) between the pixel electrodes PX1 and PX2, which can improve the aperture ratio (AR) efficiently. The coupling electrode 331 is disposed in the first region A1, and is capacitively coupled to the pixel electrode PX1. Gate electrodes of the switching transistors T1 and T3 both are electrically connected to gate line GL(n) of the two adjacent gate lines GL(n), GL(n+1), and source electrodes of the switching transistors T1 and T3 both are electrically connected to date line DL(m) of the two adjacent date lines DL(m), DL(m+1). The drain electrode of the switching transistor T1 is electrically connected to the pixel electrode PX1, and the drain electrode of the switching transistor T3 is electrically connected to the pixel electrode PX2. The gate electrode of the sharing transistor T2 is electrically connected to gate line GL(n+1) of the two adjacent gate lines GL(n), GL(n+1). The source electrode of the sharing transistor T2 is electrically connected to the coupling electrode 331, and the drain electrode of the sharing transistor T2 is electrically connected to the pixel electrode PX2 via the auxiliary electrode 341. The auxiliary electrodes 321 and 341 both have a cross like shape and are electrically isolated from each other. The common electrode COM includes a cross like structure in the first region A1 and a cross like structure in the second region A2. The two cross like structure are connected at the gap 35, and the size and ratio of the two cross like structure can be varied according to requirement of design, but not limited. It is necessary to specify that the gap 35 is defined by spacing the pixel electrodes PX1 and PX2 apart from each other and horizontally arranging the pixel electrodes PX1, PX2 in the pixel area AA. Specifically, the pixel electrode PX1 and pixel electrode PX2 are arranged in the pixel area AA according to the arrangement of the first region A1 and the second region A2. The pixel electrode PX1 is in the first region A1, and the pixel electrode PX2 is in the second region A2. The pixel electrode PX1 in the first region A1 and the pixel electrode PX2 in the second region A2 are away from each other.

Figure 4:
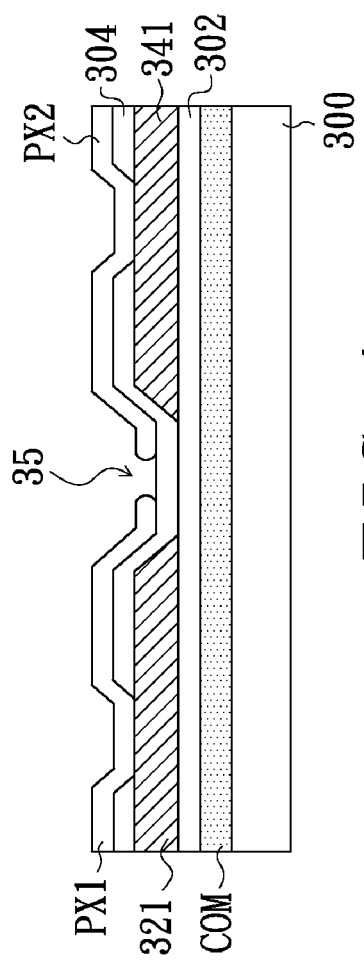
FIG. 4 is a cross sectional view taken along line I-I' in FIG. 3.

The configuration relation of the pixel electrodes PX1, PX2, the coupling electrode 331, the auxiliary electrode 321 and 341, and common electrode COM of the sub-pixel in the present embodiment will be described in detail with reference to FIGS. 3 to 6. FIG. 4 is a cross sectional view taken along line I-I' in FIG. 3, FIG. 5 is a cross sectional view taken along line II-IF in FIG. 3, and FIG. 6 is a cross sectional view taken along line III-III' in FIG. 3.

As shown in FIG. 4, the common electrode COM is disposed on the substrate 300, the auxiliary electrodes 321 and 341 are electrically isolated from the common electrode COM via a dielectric layer 302. A dielectric layer 304 is interposed between pixel electrodes PX1, PX2, and auxiliary electrodes 321, 341. The pixel electrodes PX1, PX2 are electrically connected to the auxiliary electrodes 321, 341, respectively. In other words, the common electrode COM is between the substrate 300 and the pixel electrode PX1, and is also disposed between the substrate 300 and the pixel electrode PX2. The common electrode is capacitively coupled to the pixel electrodes PX1 and PX2. The auxiliary electrode 321 is between the common electrode COM and the pixel electrode PX1, and is electrically connected to the pixel electrode PX1; the auxiliary electrode 341 is between the common electrode COM and the pixel electrode PX2, and is electrically connected to the pixel electrode PX2.

Figure 5:
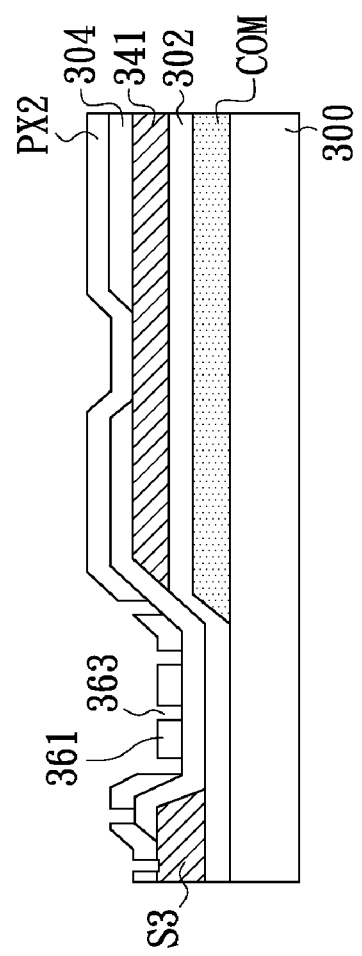
FIG. 5 is a cross sectional view taken along line II-II' in FIG. 3.

As shown in FIG. 5, the pixel electrode PX2 and the auxiliary electrode 341 are electrically connected to a drain electrode S3 of the switching transistor T3, and the pixel electrode PX2 has a number of bar shaped portions 361. A slit 363 is defined between each two adjacent bar shaped portions 361.

Figure 6:
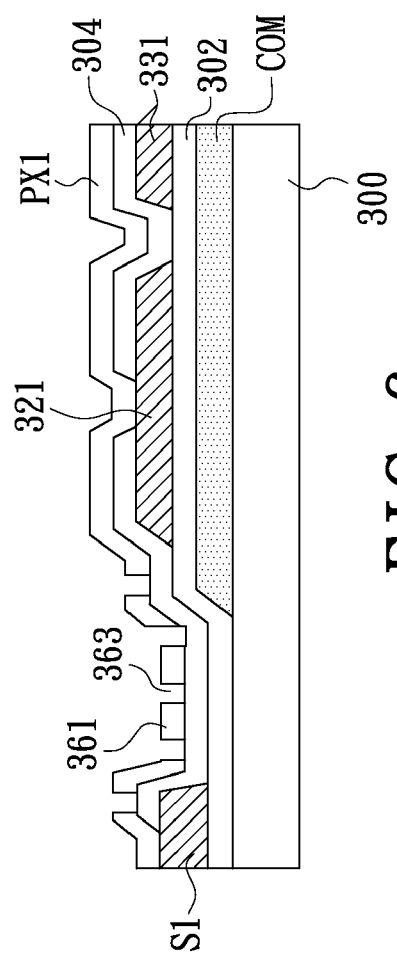
FIG. 6 is a cross sectional view taken along line III-III' in FIG. 3.

As shown in FIG. 6, similarly, the pixel electrode PX1 and the auxiliary electrode 321 are electrically connected to a drain electrode S1 of the switching transistor T1, and the pixel electrode PX1 has a number of bar shaped portions 361. A slit 363 is defined between each two adjacent bar shaped portions 361. In addition, the coupling electrode 331 is between the common electrode COM and the pixel electrode PX1, and is electrically isolated from the common electrode COM and pixel electrode PX1 via the dielectric layers 302 and 304, respectively. That is, the coupling electrode 331 is capacitively coupled to the common electrode COM and the pixel electrode PX1. Also, the coupling electrode 331 is electrically connected to the pixel electrode PX2 via the sharing transistor T2 (referring together to FIG. 3) such that electric charge on the pixel electrodes PX1 and PX2 can be redistributed.

What is need to be explained is that the pixel electrodes PX1 and PX2 are not limited to be arranged at the top layer as shown in FIG. 4 and FIG. 6. In other embodiments, the pixel electrodes PX1 and PX2 can also be arranged between the common electrode COM and the substrate 300, and electrically isolated from the common electrode COM. Also in still other embodiments, the pixel electrodes PX1 and PX2 can be disposed between the common electrode COM and the auxiliary electrode 321, electrically isolated from the common electrode COM, and electrically connected to the auxiliary electrodes 321, 341 respectively.

Figure 7:
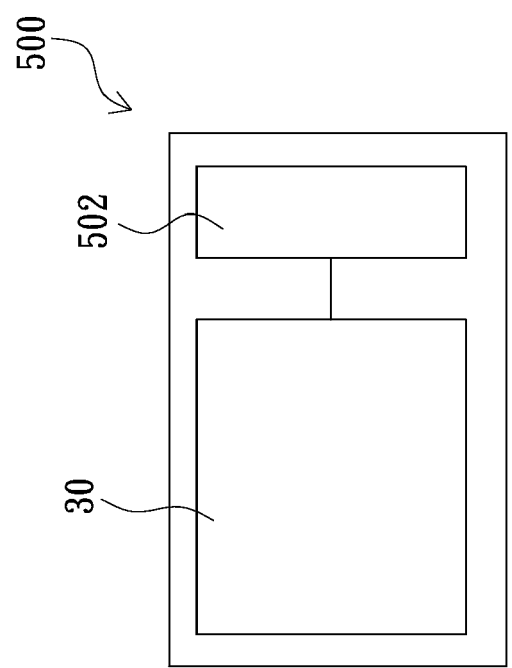
FIG. 7 is a schematic view of an electro-optical apparatus according to an embodiment of the present invention.

FIG. 7 is a schematic view of an electro-optical apparatus according to an embodiment of the present invention. As shown in FIG. 7, the electro-optical apparatus 500 of the present embodiment includes the display device 30 in FIG. 3, and an electronic component 502 electrically connected to the display device 30. Examples of the electronic component 502 of the present embodiment include controlling member, operating member, processing member, inputting member, memory member, driving member, light emitting member, protecting member, sensing member, detecting member, or electronic member having other functions. The electro-optical apparatus 500 can be portable electronic devices (such as mobile phones, video recorders, digital cameras, notebook computers, game players, watches, music players, email receivers, map guiding devices, digital photo frames, e-paper, or other similar products), visual/audio products (such as video/audio players or similar products), screens, televisions, displaying boards, panels in projects, etc.

In summary, each sub-pixel in the display device provided by the embodiment of the present invention includes the first region and the second region arranged along a direction substantially perpendicular to the data lines. The first pixel electrode and the second pixel electrode are respectively disposed in the first region and second region, and are spaced apart from each other. Thus, the first pixel electrode and the second pixel electrode can be applied in to a square sub-pixel configuration, and the number of metal wires of the common electrodes along a direction substantially perpendicular to the data lines can be reduced one. As a result, the aperture ratio is improved. At the same time, the first region and the second region have adequate size such that the problem of poor orientation of liquid crystal molecules can be avoided.

In addition, any one of ordinary skill in the art can also vary the structure of display devices of above embodiments. For example, the structure of the pixel electrode, the auxiliary electrode, the common electrode can be changed according to practical requirements. Also, the auxiliary electrode, and the common electrode on the substrate can be omitted. Besides, the connection relationship of the source electrode and drain electrode of each transistor can be interchanged.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device, comprising:
    a substrate;
    a plurality of gate lines disposed on the substrate; and
    a plurality of data lines disposed on the substrate, the data lines are substantially staggered with the gate lines and being define a plurality of sub-pixels, each of the sub-pixels comprising a pixel area defined by two adjacent gate lines of the plurality of gate lines and two adjacent data lines of the plurality of data lines, the pixel area at least comprising a first region and a second region, wherein each of the sub-pixels comprises:
        a first pixel electrode, disposed within the first region;
        a second pixel electrode, disposed within the second region, the second pixel electrode being spaced apart from the first pixel electrode thereby defining a gap is located between the second pixel electrode and the first pixel electrode, the gap being substantially perpendicular to the gate lines;
        a coupling electrode, disposed in the first region and capacitively coupled to the first pixel electrode;
        a first switching transistor;
        a second switching transistor, gate electrodes of the first switching transistor and the second switching transistor being both electrically connected to one of the two adjacent gate lines, first source or drain electrodes of the first switching transistor and the second switching transistor being both electrically connected to one of the two adjacent data lines, a second source or drain electrode of the first switching transistor being electrically connected to the first pixel electrode, and a second source or drain electrode of the second switching transistor being electrically connected to the second pixel electrode; and
        a sharing transistor, a gate electrode of the sharing transistor being electrically connected to another of the two adjacent gate lines, a first source or drain electrode of the sharing transistor being electrically connected to the coupling electrode, and a second source or drain electrode of the sharing transistor being electrically connected to the second pixel electrode.

2. The display device of claim 1, wherein the sub-pixels include red sub-pixels, green sub-pixels, blue sub-pixels, and white sub-pixels.

3. The display device of claim 1, wherein a ratio of an area of the coupling electrode and an area of a transparent portion of the pixel area is in the range from about 2.5% to about 4.5%.

4. The display device of claim 1, wherein a ratio of a length of the pixel area along a direction substantially parallel to the data lines to a width of the pixel area along a direction substantially parallel to the gate lines is in the range from about 0.9 to about 1.1.

5. The display device of claim 1, wherein each of the sub-pixels further includes a common electrode, the common electrode being disposed between the substrate and the coupling electrode, between the substrate and the first pixel electrode, and between the substrate and the second pixel electrode, wherein the common electrode being capacitively coupled to the coupling electrode, the first pixel electrode and the second pixel electrode.

6. The display device of claim 5, wherein each of the sub-pixels further includes a first auxiliary electrode, the first auxiliary electrode being between the common electrode and the first pixel electrode, and being electrically connected to the first pixel electrode.

7. The display device of claim 6, wherein each of the sub-pixels further includes a second auxiliary electrode, the second auxiliary electrode being between the common electrode and the second pixel electrode, and being electrically connected to the second pixel electrode and the second source or drain electrode of the sharing transistor.

8. The display device of claim 1, wherein the first pixel electrode and the second pixel electrode both include a plurality of bar shaped portions, a slit is defined between each two adjacent bar shaped portions.

9. An electro-optical apparatus incorporating the display device of claim 1.

* * * * *